United States Patent
Sakamoto (10) Patent No.: US 7,017,895 B2
(45) Date of Patent: Mar. 28, 2006

(54) POSITIONING AND CLAMPING DEVICE

(75) Inventor: Tsuyoshi Sakamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/103,597

(22) Filed: Apr. 12, 2005

(65) Prior Publication Data

US 2005/0225017 A1   Oct. 13, 2005

(30) Foreign Application Priority Data

Apr. 12, 2004 (JP) ............................. 2004-116337
Mar. 17, 2005 (JP) ............................. 2005-076379

(51) Int. Cl.
*B32Q 3/08* (2006.01)

(52) U.S. Cl. ............................. 269/32; 269/47; 269/49

(58) Field of Classification Search ................. 269/32, 269/47, 49, 24–27, 91–994
See application file for complete search history.

(56) References Cited

U.S. PATENT DOCUMENTS

| | | | |
|---|---|---|---|
| 6,378,855 B1 * | 4/2002 | Sawdon et al. ............... 269/32 |
| 6,698,736 B1 * | 3/2004 | Dugas et al. ................. 269/32 |
| 6,902,160 B1 * | 6/2005 | Zajac, Jr. et al. ............. 269/49 |
| 6,931,980 B1 * | 8/2005 | Zajac Jr. et al. .............. 91/396 |
| 2002/0100155 A1 | 8/2002 | Nakamura |
| 2005/0051939 A1 * | 3/2005 | Beffrieu ....................... 269/32 |

FOREIGN PATENT DOCUMENTS

JP   2002-225759 A   8/2002
JP   2003-275932 A   9/2003

* cited by examiner

*Primary Examiner*—Lee D. Wilson
(74) *Attorney, Agent, or Firm*—Foley & Lardner LLP

(57) ABSTRACT

A locating pin is mounted on a hollow post member in such a manner that a slit of the locating pin is communicated with an interior of the post member. A clamp arm is axially movably received in the slit and has a hook-shaped head exposed to an upper portion of the slit and a base portion exposed to the interior of the post member. The clamp arm is axially movable between a clamp position wherein the hook-shaped head is projected outward from the upper portion of the slit and an unclamp position wherein the hook-shaped head is retracted in the upper portion of the slit. A guard structure is installed in the slit of the locating pin to isolate the interior of the post member from the interior of the slit while permitting the axial movement of the clamp arm in the slit.

19 Claims, 11 Drawing Sheets

POSITIONING AND CLAMPING DEVICE

BACKGROUND OF THE INVENTION

1. Field of the Invention

The present invention relates in general to positioning and clamping devices that are able to clamp a work after positioning the same, and more particularly to the positioning and clamping devices of a type that is employed in a vehicle body assembling line to position and clamp a certain work panel for a subsequent welding of the work panel to a base member or the like. More specifically, the present invention is concerned with the positioning and clamping devices of a type that includes a locating pin having a clamp arm installed therein, wherein for positioning and clamping a work panel, the locating pin is inserted into a locating opening of the work panel to position the work panel and then the clamp arm clamps a peripheral portion of the locating opening of the positioned work panel.

2. Description of the Related Art

One of the positioning and clamping devices of the above-mentioned type is shown in Japanese Laid-open Patent Application (Tokkai) 2002-225759. The device of this publication comprises a locating pin that has a work seating surface for placing thereon a work panel, and a clamp arm that is installed in the locating pin and has a hook-shaped head at one end thereof. For positioning and clamping the work panel, the locating pin is inserted into a locating opening of the work panel to put on the work seating surface the work panel, and then, the clamp arm clamps a peripheral portion of the locating opening with the hook-shaped head.

SUMMARY OF THE INVENTION

The locating pin of the above-mentioned publication is formed with a slit for receiving therein the clamp arm. However, due to provision of the slit in the locating pin, it tends to occur that under the welding process of the work panel, spatters of the welding enter into the slit. This increases the possibility of inducing a malfunction of the clamp arm in the locating pin.

In order to solve such drawback, one measure has been proposed which is disclosed in Japanese Laid-open Patent Application (Tokkai) 2003-275932. In the measure of this publication, the slit for receiving therein the clamp arm is not exposed to the outside, and thus, the possibility of inducing a malfunction of the clamp arm by the spatters of welding is almost zero.

However, even the positioning and clamping device of this publication fails to provide users with a satisfaction. That is, due to the inherent construction of the device, it is difficult to stably hold the locating pin and thus difficult to keep the positioning accuracy of the locating pin at a satisfied level. Furthermore, it is difficult to make the device compact in size.

Accordingly, it is an object of the present invention to provide a positioning and clamping device which is free of the above-mentioned drawbacks.

That is, according to the present invention, there is provided a positioning and clamping device which is compact in size, simple in construction and can exhibit a high resistance against the spatters of welding.

In accordance with a first aspect of the present invention, there is provided a positioning and clamping device for positioning and clamping a work panel that has a locating opening formed therethrough, which comprises a hollow post member; a locating pin mounted on the post member, the locating pin being formed with a work seating surface onto which a peripheral portion of the locating opening of the work panel is seated when the locating pin is inserted into the locating opening; a slit defined in the locating pin and having a first portion exposed to the outside of the locating pin and a second portion exposed to the interior of the post member; a clamp arm axially movably received in the slit and having a hook-shaped head portion exposed to the first portion of the slit and a base portion exposed to the interior of the post member, the clamp arm being movable between a clamp position wherein the hook-shaped head portion is positioned near the work seating surface while projecting outward from the first portion of the slit and an unclamp position wherein the hook-shaped head portion is positioned away from the work setting surface while being retracted in the first portion of the slit; a drive mechanism installed in the interior of the post member to axially move the clamp arm between the clamp and unclamp positions; and a guard structure that isolates the interior of the post member from the interior of the slit while permitting the axial movement of the clamp arm in the slit.

In accordance with a second aspect of the present invention, there is provided a positioning and clamping device for positioning and clamping a work panel that has a locating opening formed therethrough, which comprises a hollow post member; a locating pin mounted on the post member, the locating pin being formed with a work seating surface onto which a peripheral portion of the locating opening of the work panel is seated when the locating pin is inserted into the locating opening; a slit defined in the locating pin and having a first portion exposed to the outside of the locating pin and a second portion exposed to the interior of the post member; a clamp arm axially movably received in the slit and having a hook-shaped head portion exposed to the first portion of the slit and a base portion exposed to the interior of the post member, the clamp arm being movable between a clamp position wherein the hook-shaped head portion is positioned near the work seating surface while projecting outward from the first portion of the slit and an unclamp position wherein the hook-shaped head portion is positioned away from the work setting surface while being retracted in the first portion of the slit; a drive mechanism installed in the interior of the post member to axially move the clamp arm between the clamp and unclamp positions by a power of compressed air; and a pair of guide pates that isolate the interior of the post member from the interior of the slit while permitting the axial movement of clamp arm in the slit, the guide plates being constructed of a resilient material and have base portions thereof fixed to given portions of the locating pin and strip portions thereof resiliently pressed against opposed surfaces of the clamp arm.

In accordance with a third aspect of the present invention, there is provided a positioning and clamping device for positioning and clamping a work panel that has a locating opening formed therethrough, which comprises a hollow post member; a locating pin mounted on the post member, the locating pin being formed with a work seating surface onto which a peripheral portion of the locating opening of the work panel is seated when the locating pin is inserted into the locating opening; a slit defined in the locating pin and having a first portion exposed to the outside of the locating pin and a second portion exposed to the interior of the post member; a clamp arm axially movably received in the slit and having a hook-shaped head portion exposed to the first portion of the slit and a base portion exposed to the interior of the post member, the clamp arm being movable between a clamp position wherein the hook-shaped head portion is positioned near the work seating surface while projecting outward from the first portion of the slit and an unclamp position wherein the hook-shaped head portion is positioned away from the work setting surface while being retracted in the first portion of the slit; a drive mechanism installed in the interior of the post member to axially move the clamp arm between the clamp and unclamp positions by a power of compressed air; and a guide plate constructed of a resilient material and arranged in the slit having a base portion thereof fixed to a given portion of the locating pin and a strip portion thereof resiliently pressed against a surface of the clamp arm thereby to bias the clamp arm in a direction from the unclamp position to the clamp position.

DETAILED DESCRIPTION OF THE EMBODIMENTS

In the following, various embodiments 100, 200, 300, 400 and 500 of the present invention will be described in detail with reference to the accompanying drawings.

For ease of understanding, various directional terms, such as upper, lower, right, left, upward and the like are used in the following description. However, these terms are to be understood with respect to only a drawing or drawings on which corresponding part or portion is shown. Throughout the description of the embodiments, substantially same elements and portions are denoted by the same numerals, and repeated explanation of them will be omitted.

Figure 1:
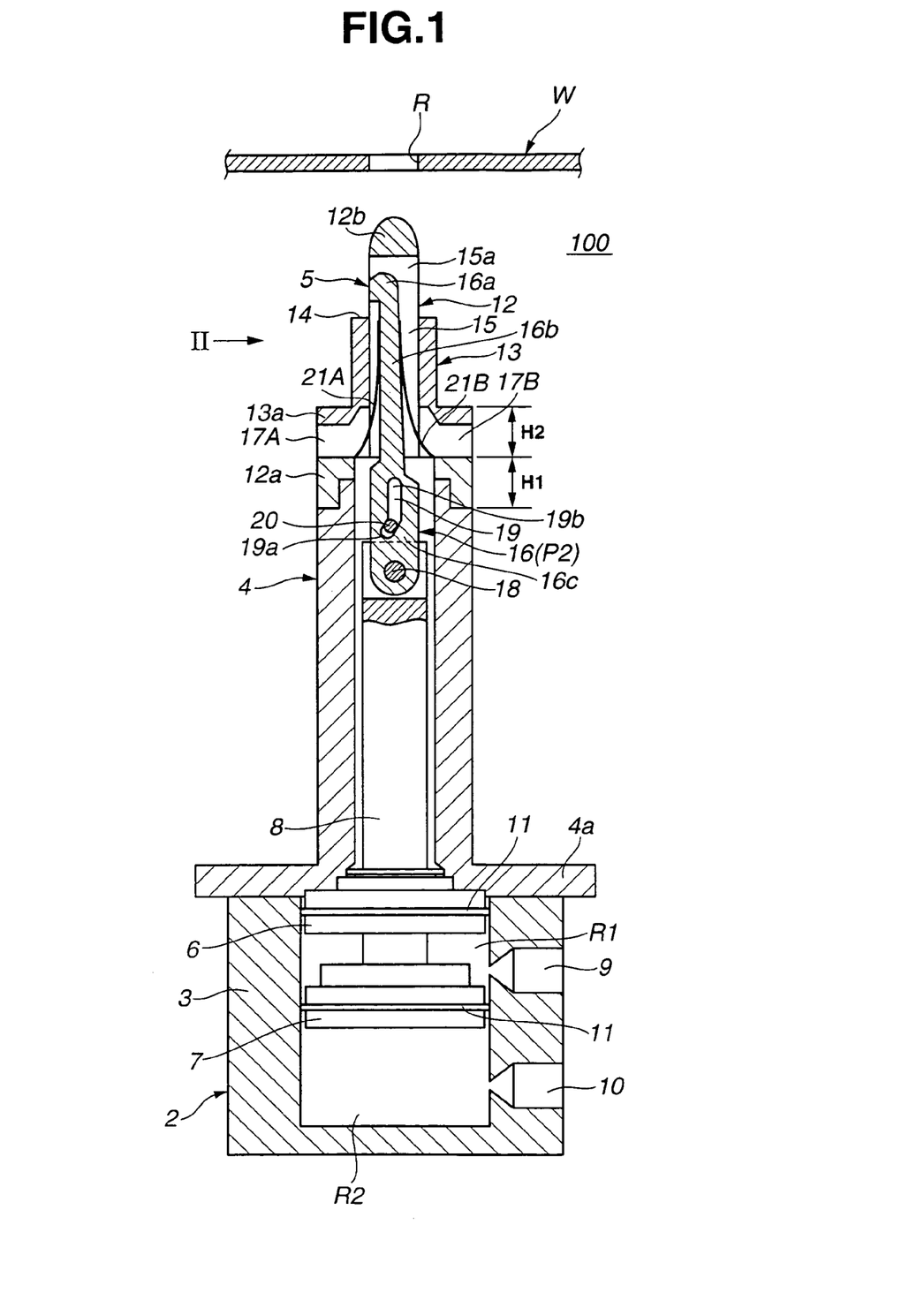
FIG. 1 is a sectional view of a positioning and clamping device which is a first embodiment of the present invention.

Referring to FIGS. 1 to 5, particularly FIG. 1, there is shown a positioning and clamping device 100 of a first embodiment of the present invention. Under usage, device 100 has such a stand posture as shown in FIG. 1.

As shown in FIG. 1, positioning and clamping device 100 comprises generally an air cylinder 2 that has a cylindrical portion 3 serving as an actuator, a cylindrical post member 4 that has a larger diameter flange 4a put on a top of cylindrical portion 3 of air cylinder 2, and a locating pin 5 that is mounted on a top portion of post member 4.

As shown, cylindrical portion 3 of air cylinder 2 has a bottom wall (no numeral), and a circular end cap 6 is tightly received in an upper end of the interior of cylindrical portion 3 having a sealing member 11 such as O-ring or the like compressed therebetween. With this, an enclosed chamber (R1+R2) is defined by the interior of cylindrical portion 3.

In the enclosed chamber, there is axially movably disposed a piston 7 that has a sealing member 11 (or O-ring) compressed between an outer cylindrical surface of piston 7 and an inner cylindrical wall of cylindrical portion 3. Due to provision of piston 7, the enclosed chamber is divided into upper and lower work chambers R1 and R2.

A piston rod 8 extends upward from piton 7 through an opening formed in end cap 6 into the interior of cylindrical post member 4. A top end of piston rod 8 is pivotally connected to a clamp arm 16 as will be described in detail hereinafter. Thus, piston rod 8 serves as a drive means for vertically moving clamp arm 16 in forward and backward directions.

Two ports 9 and 10 are formed in cylindrical portion 3, one 9 being connected to upper work chamber R1 and the other 10 being connected to lower work chamber R2. Thus, when these two work chambers R1 and R2 are selectively fed with compressed air through ports 9 and 10, piston 7 is moved upward or downward together with piston rod 8.

Locating pin 5 comprises a pin member 12 that has a larger diameter lower flange portion 12a and a work seating hollow table member 13 that has a larger diameter lower flange portion 13a. The thickness (or height) of lower flange portion 12a of pin member 12 is denoted by "H1" and the thickness (or height) of lower flange portion 13a of table member 13 is denoted by "H2", in the drawing.

As is shown in the drawing, work seating hollow table member 13 is put on pin member 12 to constitute a unit, and this unit is put on the top portion of cylindrical post member 4.

Although not shown in the drawings, a plurality of bolts are used for connecting post member 4, pin member 12 and hollow table member 13 together.

As shown in FIG. 1, work seating hollow table member 13 is formed with a work seating top end (or surface) 14 that is able to put thereon a work panel "W" when pin member 12 is properly received in a locating opening "R" of the work panel "W". That is, as is easily understood from FIG. 1, in such case, a lower peripheral portion of locating opening "R" of work panel "W" is seated on the top end 14 of the table member 13.

Figure 2:
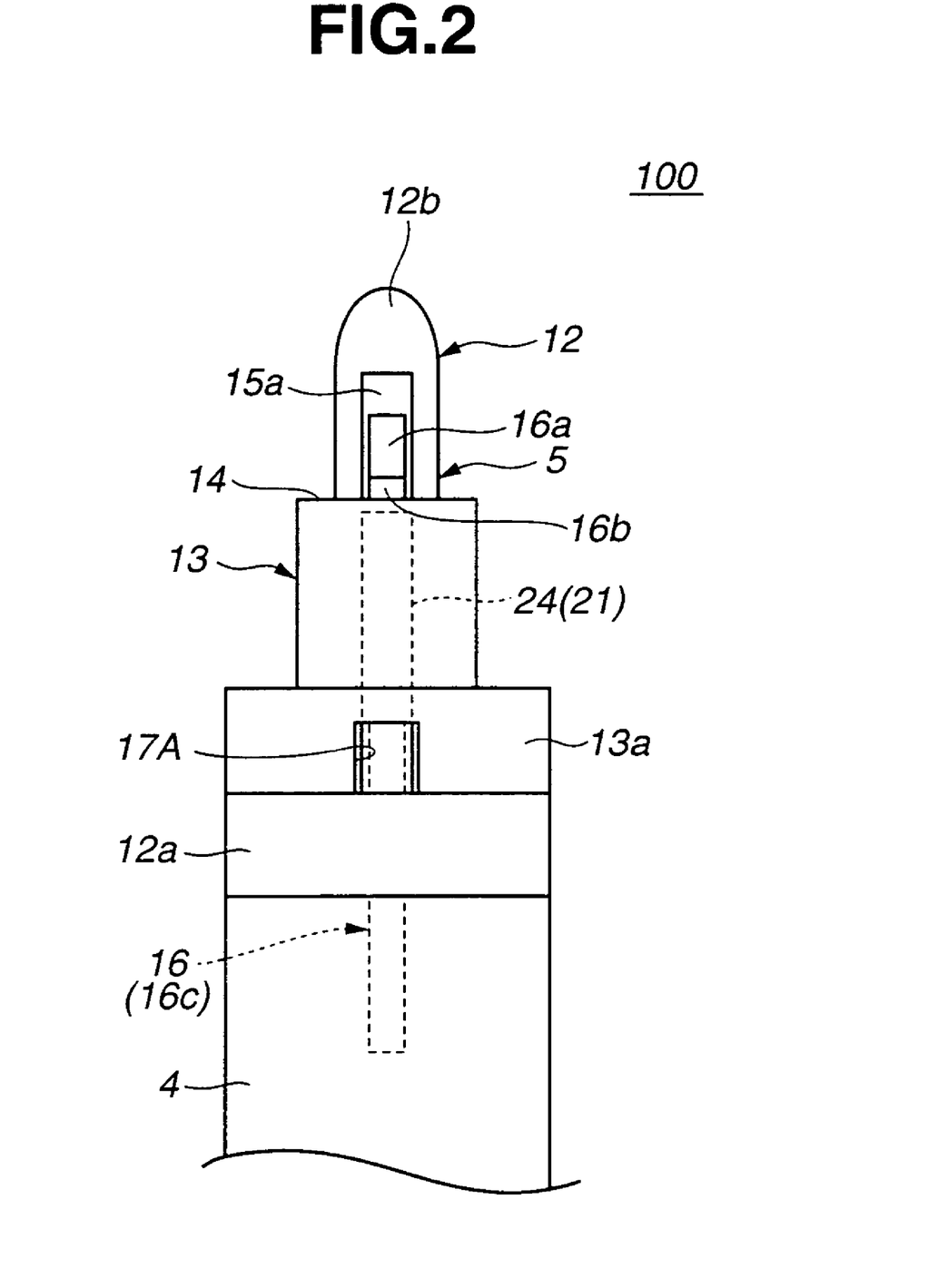
FIG. 2 is an enlarged view of an essential part of the positioning and clamping device of the first embodiment, which is taken from the direction of the arrow "II" of FIG. 1.

As is understood from FIGS. 1 and 2, pin member 12 of locating pin 5 is formed with a through slit (or slot) 15 that extends in a diametrical direction. As is understood from the drawings, slit 15 has a lower end merged with an upper end of the interior of cylindrical post member 4. That is, slit 15 is merged with the interior of post member 4.

A clamp arm 16 is received in slit 15 and the upper part of the interior of post member 4, as shown.

As shown, clamp arm 16 comprises a base portion 16c, an shank portion 16b and a hook-shaped head portion 16a.

As will be seen from FIG. 2, an upper portion 15a of slit 15, that is positioned above the work seating top end 14 of table member 13, is constantly exposed to the outside of the device 100.

As is seen from FIGS. 1 and 2, lower flange portion 13a of table member 13 that holds therein pin member 12 is formed with diametrically aligned escape ports 17A and 17B which are merged with a lower portion of slit 15.

Hook-shaped head 16a of clamp arm 16 is received in the upper portion 15a of slit 15, and lower base portion 16c of clamp arm 16 is pivotally connected to the upper end of piston rod 8 through a pin 18.

As is seen from FIG. 1, clamp arm 16 is formed at a position just above pin 18 with a cam slot 19. That is, cam slot 19 includes shorter and longer slot parts 19a and 19b which are angled by a certain degree. A guide pin 20 passes through cam slot 19 and is connected to diametrically opposed portions of the cylindrical bore of post member 4.

When, as is understood in FIG. 1, piston 7 and thus piston rod 8 and clamp arm 16 move up to their uppermost positions, a lower end of shorter slot part 19a of cam slot 19 is brought into abutment with guide pin 20. Under this condition, further upward movement of clamp arm 16 relative to locating pin 5 is suppressed and clamp arm 16 assumes its unclamp position "P2". Under this condition, hook-shaped head 16a of clamp arm 16 is kept inside of slit 15, that is, the head 16a is not projected outward from slit 15.

Within slit 15, there is arranged a guard unit 21 for not only guiding the movement of clamp arm 16 but also isolating the interior of slit 15 from the interior of post member 4, as will become apparent as the description proceeds.

Figure 3:
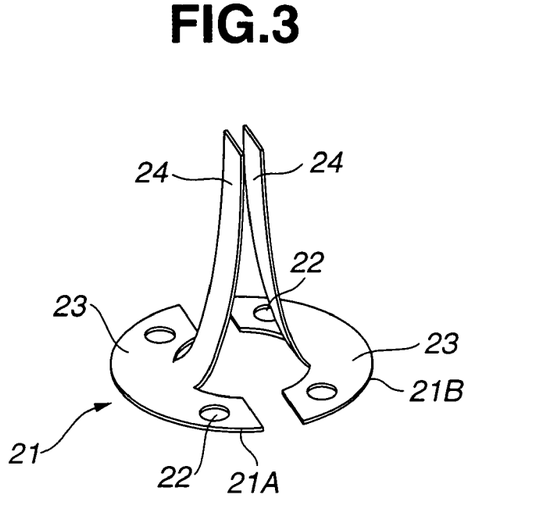
FIG. 3 is a perspective view of a guard unit employed in the positioning and clamping device of the first embodiment.
Figure 4:
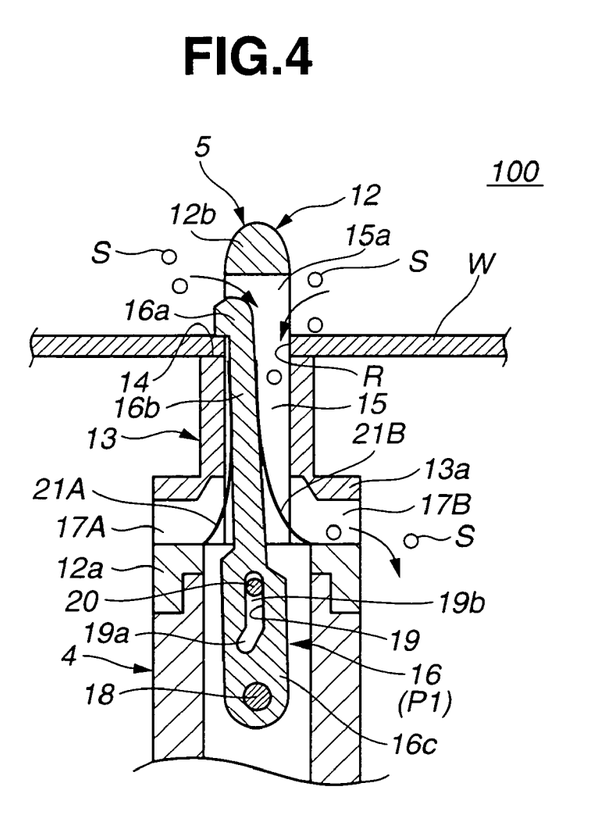
FIG. 4 is a partial sectional view of the positioning and clamping device of the first embodiment in a condition wherein the device clamps a work panel.

As is seen from FIG. 3, guard unit 21 comprises two identical guide plates 21A and 21B that are arranged to put therebetween clamp arm 16 (see FIG. 4). Each guide plate 21A or 21B is made of a steel plate or the like and comprises a semicircular base portion 23 that has bolt openings 22 and a strip portion 24 that extends upward from a middle part of base portion 23. Strip portion 24 is gently curved.

As is seen from FIGS. 1 and 4, the two guide plates 21A and 21B are arranged symmetrically with respect to an axis of cylindrical post member 4 having base portions 23 thereof tightly put between flange portion 12a of pin member 12 and flange portion 13a of table member 13. The bolts used for combining post member 4, pin member 12 and table member 13 together pass through bolt openings 22 of guide plates 21A and 21B. The strip portions 24 of these guide plates 21A and 21B are resiliently pressed at their convex sides against opposed surfaces of shank portion 16b of clamp arm 16.

Due to provision of guard unit 21, the interior of slit 15 of pin member 12 is divided into a plurality of zones. As is seen from FIG. 4, the upper portion 15a of slit 15 is communicated with escape ports 17A and 17B mainly through zones of the slit 15 that surround guard unit 21, and the inside zone of guard unit 21 is communicated with the interior of post member 4.

It is to be noted that due to presence of guard unit 21, the interior of the upper portion 15a of slit 15 and the interior of post member 4 are isolated from each other.

In the above-mentioned arrangement, guard unit 21 is of a type having strip portions 24 resiliently and constantly pressed against shank portion 16b of clamp arm 16. However, if desired, as will be described in detail hereinafter, an arrangement may be employed wherein only when clamp operation is carried out by clamp arm 16, the strip portions 24 are resiliently flexed in order to smooth the movement of clamp arm 16.

As is seen from FIG. 1, the work panel "W" that is to be positioned and clamped by positioning and clamping device 100 of the invention is formed with a circular locating opening "R" into which locating pin 5 is to be inserted.

In the following, operation of positioning and clamping device 100 of the invention will be described with reference to FIGS. 1 and 4 of the drawings.

When, as will be understood from FIG. 1, due to full insertion of locating pin 5 into locating opening "R" of work panel "W", the peripheral portion of locating opening "R" is stably seated on work seating top end 14 of table member 13, the positioning of work panel "W" relative to locating pin 5 is established. When, thereafter, a compressed air is led into upper work chamber R1 through port 9 while permitting escape of air from lower work chamber R2 through the other port 10, piston 7 and thus piston rod 8 are moved down pulling clamp arm 16 downward from the position "P2" of FIG. 1.

When thus clamp arm 16 is moved downward, guide pin 20 is led into longer slot part 19b disengaging from shorter slot part 19a. Due to this change of position of guide pin 20 in cam slot 19, clamp arm 16 is forced to incline counterclockwise in FIG. 1 causing hook-shaped head 16a of clamp arm 16 to gradually project outward from the upper portion 15a of slit 15.

When clamp arm 16 is finally moved down to a position "P1" as shown in FIG. 4, the projected hook-shaped head 16a of clamp arm 16 is pressed against a peripheral portion of locating opening "R" of work panel "W". With this, work panel "W" is tightly clamped in the set position. That is, positioning and clamping of work panel "W" are established. It is to be noted that this clamped condition of work panel "W" is kept as long as the compressed air is left in upper work chamber "R1".

Thereafter, work panel "W" thus stably clamped is subjected to a subsequent processing, that is, a spot welding or the like.

As is understood from FIG. 4, upon the spot welding, spatters "S" of welding are produced and some of them fly to the area of locating pin 5, and some of them may enter slit 15 from the upper portion 15a thereof. However, in such case, the spatters "S" that have entered slit 15 are easily discharged to the outside through escape ports 17A and 17B using the curved strip portions 24 of guard unit 21 as slide means.

Since the interior of post member 4 is isolated from the slit by means of guard unit 21 as has been described hereinabove, the spatters "S" are prevented from entering the interior of post member 4.

Thus, malfunction of clamp arm 12 which would be caused by such spatters "S" is suppressed.

Figure 5:
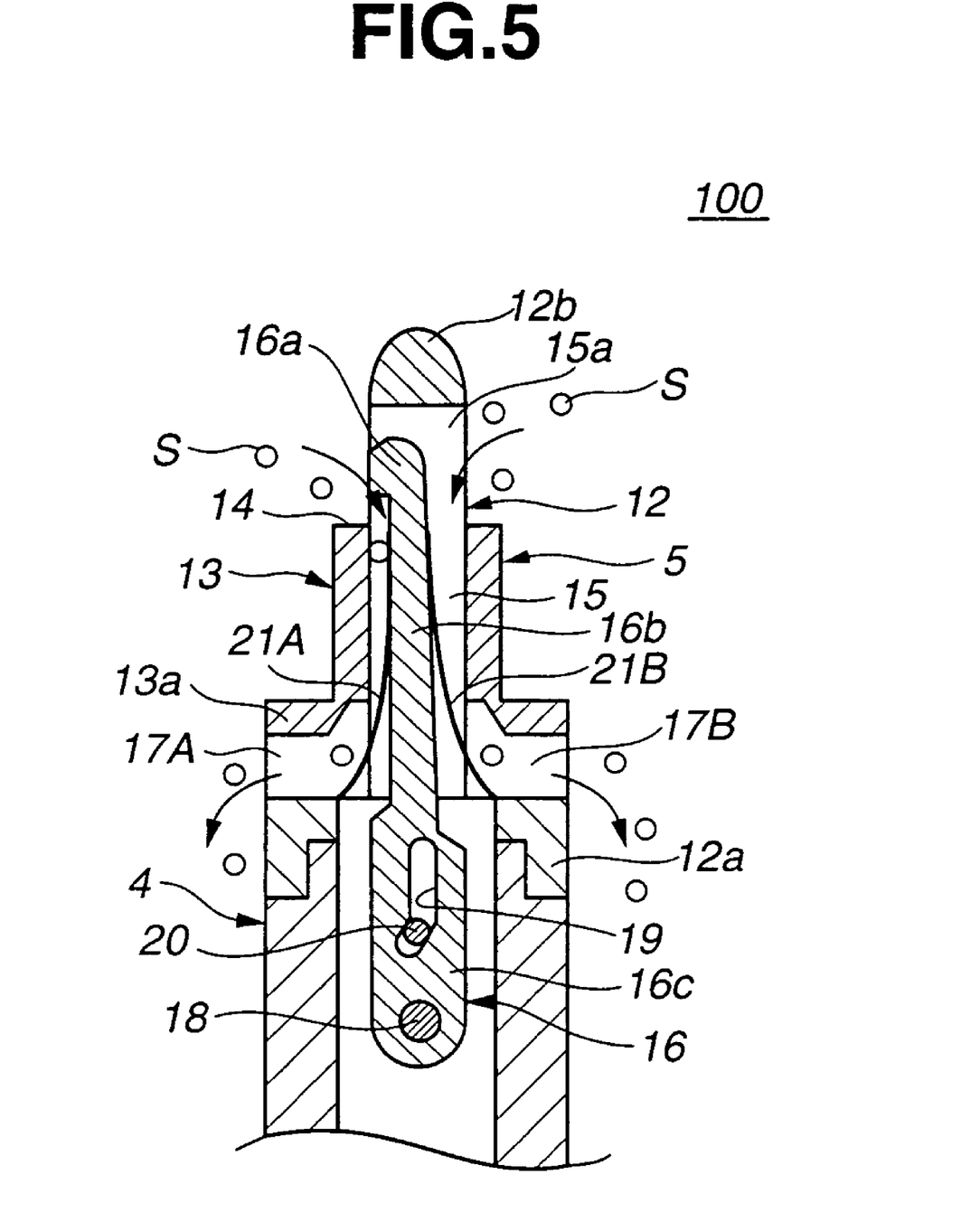
FIG. 5 is a view similar to FIG. 4, but showing a condition wherein the device releases the work panel.

FIG. 5 shows a case wherein the spatters "S" of welding fly to the device 100 that is under an unclamp condition of clamp arm 16. Actually, under the welding process of work panel "W", some of positioning and clamping devices 100 may take a stand-by position for a subsequent clamp condition. Even in such case, the spatters "S" that would enter slit 15 through the two passages produced at front and rear of clamp arm 16 are easily discharged to the outside through escape ports 17A and 17B, as shown. Furthermore, due to the isolation between the interior of post member 4 and the slit 15, the interior of post member 4 is protected by such spatters "S".

For releasing work panel "W" after welding of the same, a reversed operation is carried out by positioning and clamping device 100.

That is, in such case, the compressed air is led into lower work chamber R2 through port 10 while discharging air from upper work camber R1 through port 9. With this, piston 7 and thus piston rod 8 are moved upward pushing clamp arm 16 upward from the position "P1" of FIG. 4. Thus, hook-shaped head 16a of clamp arm 16 is moved upward away from work panel "W" releasing the same.

During this, guide pin 20 is led into shorter slot part 19a disengaging from longer slot part 19b and thus clamp arm 16 is forced to incline clockwise in FIG. 4 causing hook-shaped head 16a of clamp arm 16 to retract into the upper portion 15a of slit 15. Thus, finally, clamp arm 16 assumes its unclamp position as is shown in FIG. 5. Under this condition, work panel "W" can be easily released from positioning and clamping device 100 as will be understood from FIG. 1.

As is described hereinabove, each time clamp arm 16 is subjected to a position change from unclamp to clamp position or from clamp to unclamp position, the opposed surfaces of shank portion 16b of clamp arm 16 slide on the resilient strip portions 24 of guard unit 21. Thus, even if some spatters "S" of welding are left on clamp arm 16, the slide movement of shank portion 16b of clamp arm 16 relative to strip portions 24 causes the leading ends of strip portions 24 to scrape the spatters "S" away from clamp arm 16.

As is mentioned hereinabove, strip portions 24 of guard unit 21 are arranged to be resiliently pressed against the opposed surfaces of shank portion 16b of clamp arm 16. Thus, even if the strip portions 24 are worn down, the function of the guard unit 21 is kept so long as the strip portions 24 are resiliently pressed against shank portion 16b of clamp arm 16. That is, guard unit 21 can be used for a sufficiently long time.

In the above-mentioned positioning and clamping device 100, the locating pin 5 is constructed by pin member 12 and table member 13 which are separate members. However, if desired, one piece structure may be employed in place of such two members 12 and 13. Furthermore, if desired, positioning and clamping device 100 may be used as a hand device of an automatic manipulator.

In the following, modifications of the first embodiment 100 will be described.

Due to unavoidable dimensional error, there is inevitably produced a certain play between cam slot 19 (see FIG. 4) and guide pin 20. Thus, in case wherein clamp arm 16 is going to change its position from the clamp position of FIG. 4 to the unclamp position of FIG. 5, it sometimes occurs that clamp arm 16 fails to reach its uppermost position (viz., full release position). In this case, it tends to occur that hook-shaped head 16a of clamp arm 16 still projects outward from slit 15. In this case, as is easily understood from FIG. 4, locating pin 5 of the device 100 can not be easily drawn out from locating opening "R" of work panel "W".

In order to solve such drawback, the two strip portions 24 of guard unit 21 may be constructed to have different spring constants. With this, operation stability of clamp arm 16 at the time when clamp arm 16 is moved up from the clamp position of FIG. 4 to the unclamp position is improved. More specifically, the spring constant of the strip portion 24 of the left guide plate 21A (see FIG. 4) should be higher than that of the right guide plate 21B. That is, the biasing force produced by guard unit 21 when clamp arm 16 is moved up should be higher than that produced by guard unit 21 when clamp arm 16 is moved down. With this measure, hook-shaped head 16a of clamp arm 16 can be assuredly or fully retracted into slit 15 when clamp arm 16 assumes its uppermost position. For this measure, left and right guide plates 21A and 21B may be made of steels having different spring constants. Differentiating the thickness of strip portions 24 of these left and right guide plates 21A and 21B may be another measure.

When locating pin 5 is subjected to the position change between clamp and unclamp positions (see FIGS. 4 and 5) as described hereinabove, strip portions 24 of guard unit 21 are resiliently deformed mainly in a lateral direction. Thus, if a clearance between each of strip portions 24 and a wall of slit 15 that faces an edge of the strip portion 24 is too small, it may occur that the leading end of each strip portion 24 is caught by the wall.

Figure 6:
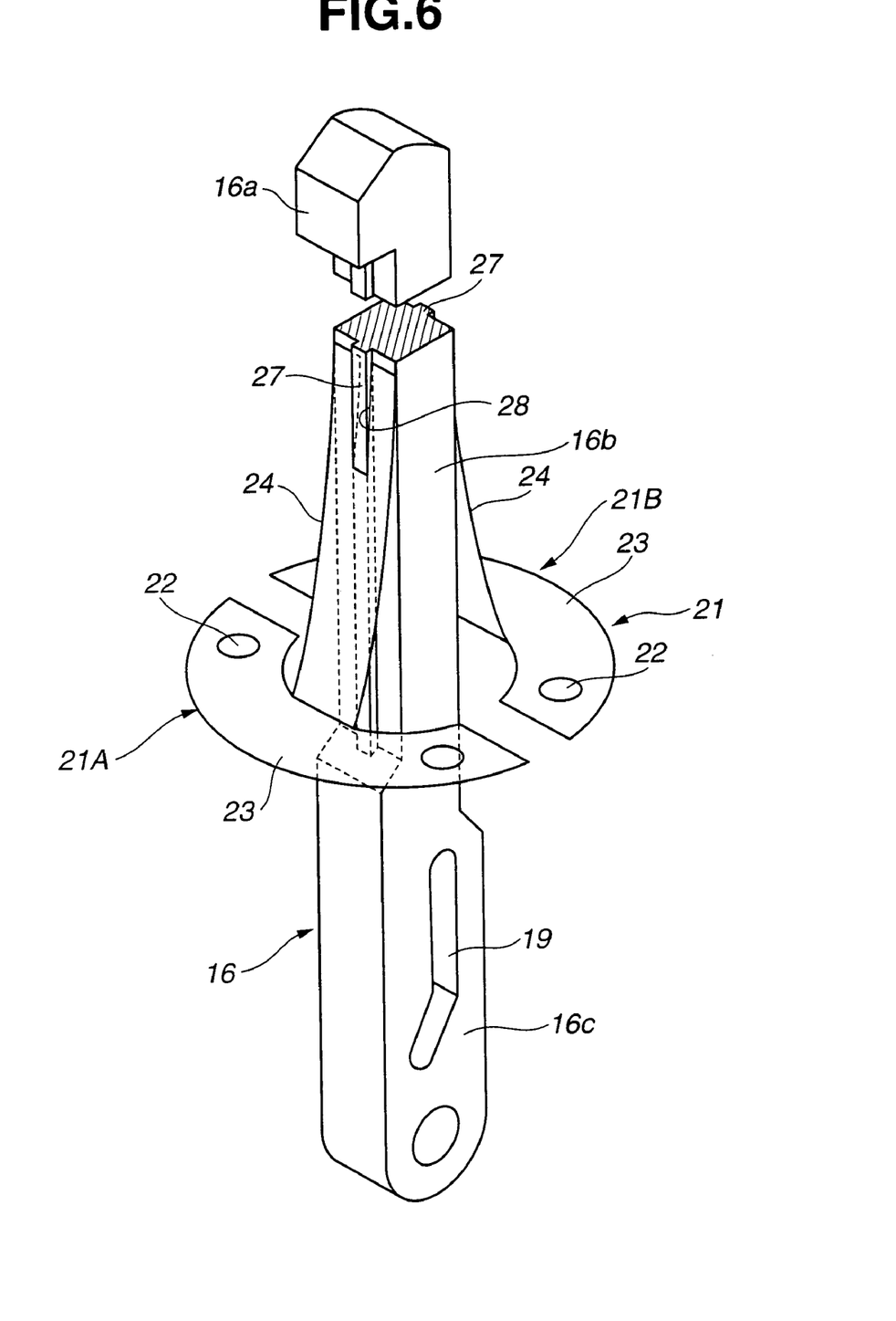
FIG. 6 is a schematic perspective view of a modified unit including a clamp arm and a guard unit, which is employable in the positioning and clamping device of the first embodiment.
Figure 7:
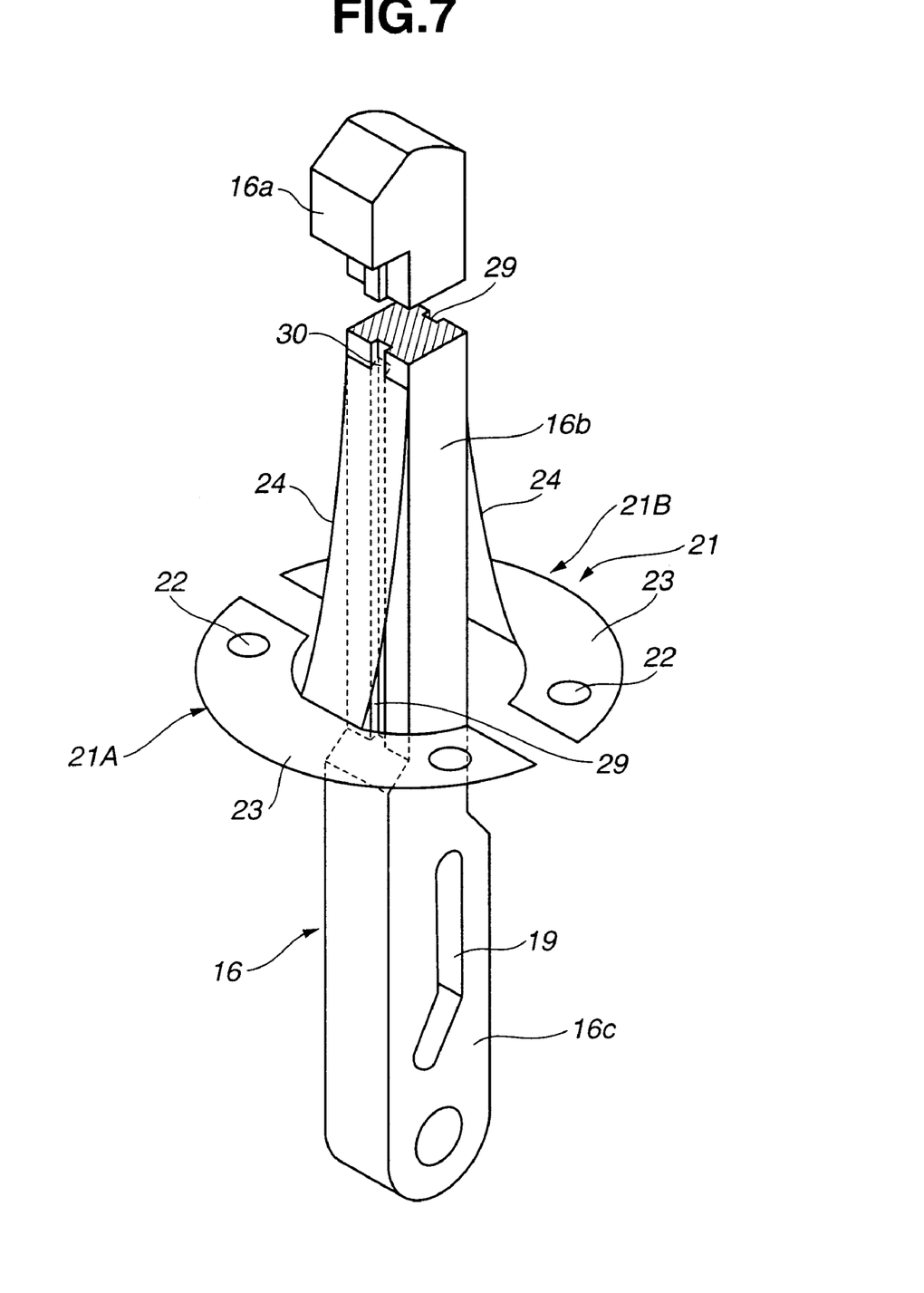
FIG. 7 is a view similar to FIG. 6, but showing another modified unit employable in the positioning and clamping device of the first embodiment.

In order to solve such drawback, two measures are employable in the first embodiment 100, which are depicted in FIGS. 6 and 7, respectively.

In the measure of FIG. 6, shank portion 16b of clamp arm 16 has at the opposed surfaces respective ridges 27 that extend vertically, and strip portions 24 of left and right guide plates 21A and 21B have at leading ends thereof respective guide grooves 28 that slidably receive ridges 27 respectively. In this measure, not only the vertical movement of clamp arm 16 but also stability of strip portions 24 in lateral direction is improved.

In the measure of FIG. 7, shank portion 16b of clamp arm 16 has at the opposed surfaces respective grooves 29 that extend vertically, and strip portions 24 of left and right guide plates 21A and 21B have at leading ends thereof respective guide pawls 30 that are slidably received in grooves 29 respectively. Also in this measure, the vertical movement of clamp arm 16 and the stability of strip portions 24 are improved.

Figure 8:
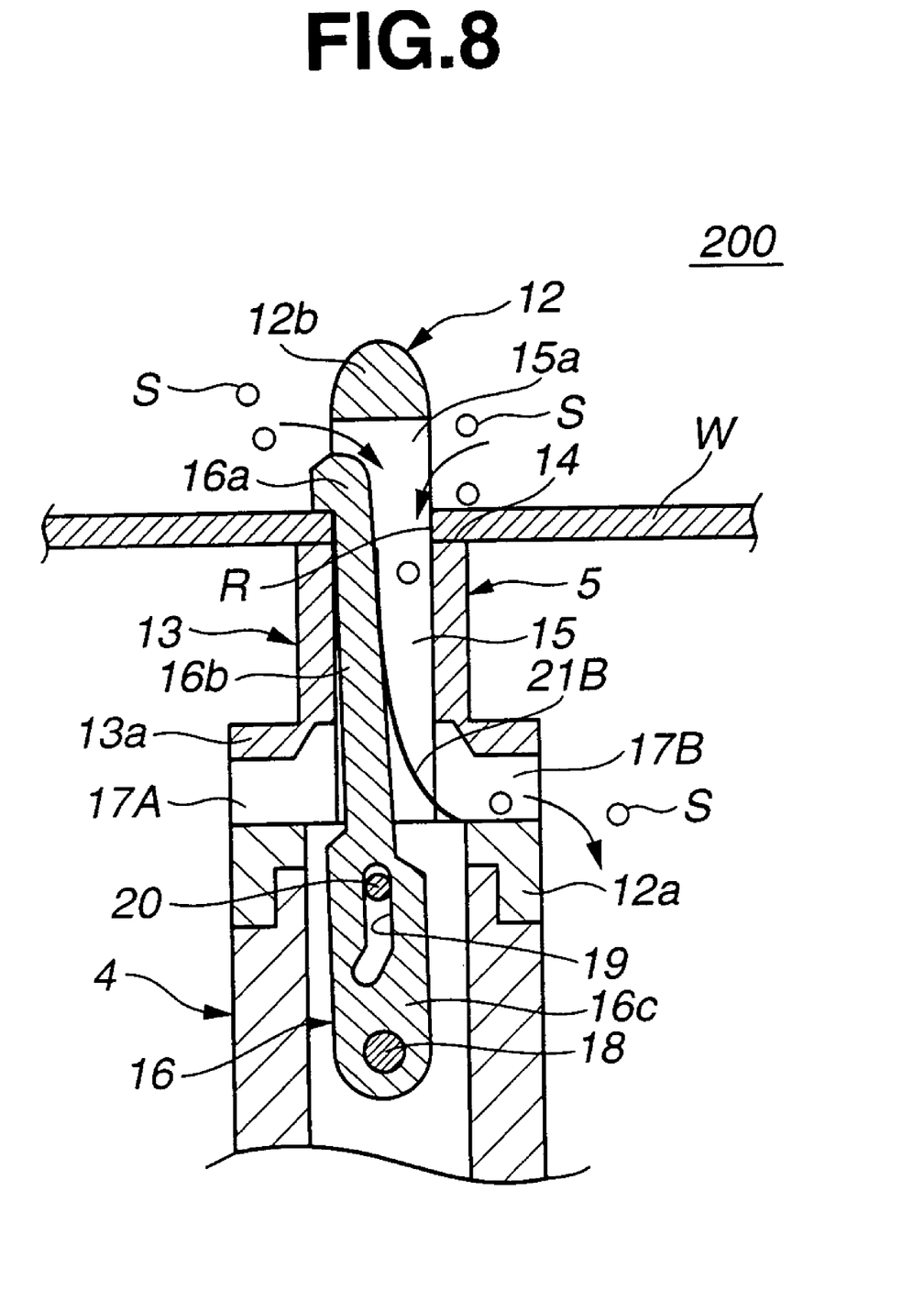
FIG. 8 is a view similar to FIG. 4, but showing a positioning and clamping device of a second embodiment of the present invention.

Referring to FIG. 8, there is shown a positioning and clamping device 200 which is a second embodiment of the present invention.

Since the device 200 of this second embodiment is similar in construction to the device 100 of the above-mentioned first embodiment, only parts or portions that are different from those of the first embodiment 100 will be described in detail in the following.

As is seen from the drawing, in this second embodiment 200, only right guide plate 21B is used, which biases clamp arm 16 in a counterclockwise direction in the drawing, that is, in a direction to project hook-shaped head 16a of clamp arm 16 outward.

This positioning and clamping device 200 is preferably usable in an area of the vehicle body assembling line where flying of spatters "S" of welding is carried out only when clamp arm 16 takes the clamp position as shown in FIG. 8. As shown in the drawing, under such clamp position, the spatters "S" entering slit 15 are easily discharged to the outside through the right-positioned escape port 17B. While, when clamp arm 16 takes the unclamp position as will be understood from FIG. 5, there is produced at a left side (as viewed in FIG. 8) of shank portion 16b a through passage that extends from slit 15 to the interior of post member 4. However, even in this case, no spatters "S" of welding are present and thus entering of the spatters "S" to the interior of post member 4 through the through passage does not take place.

Figure 9:
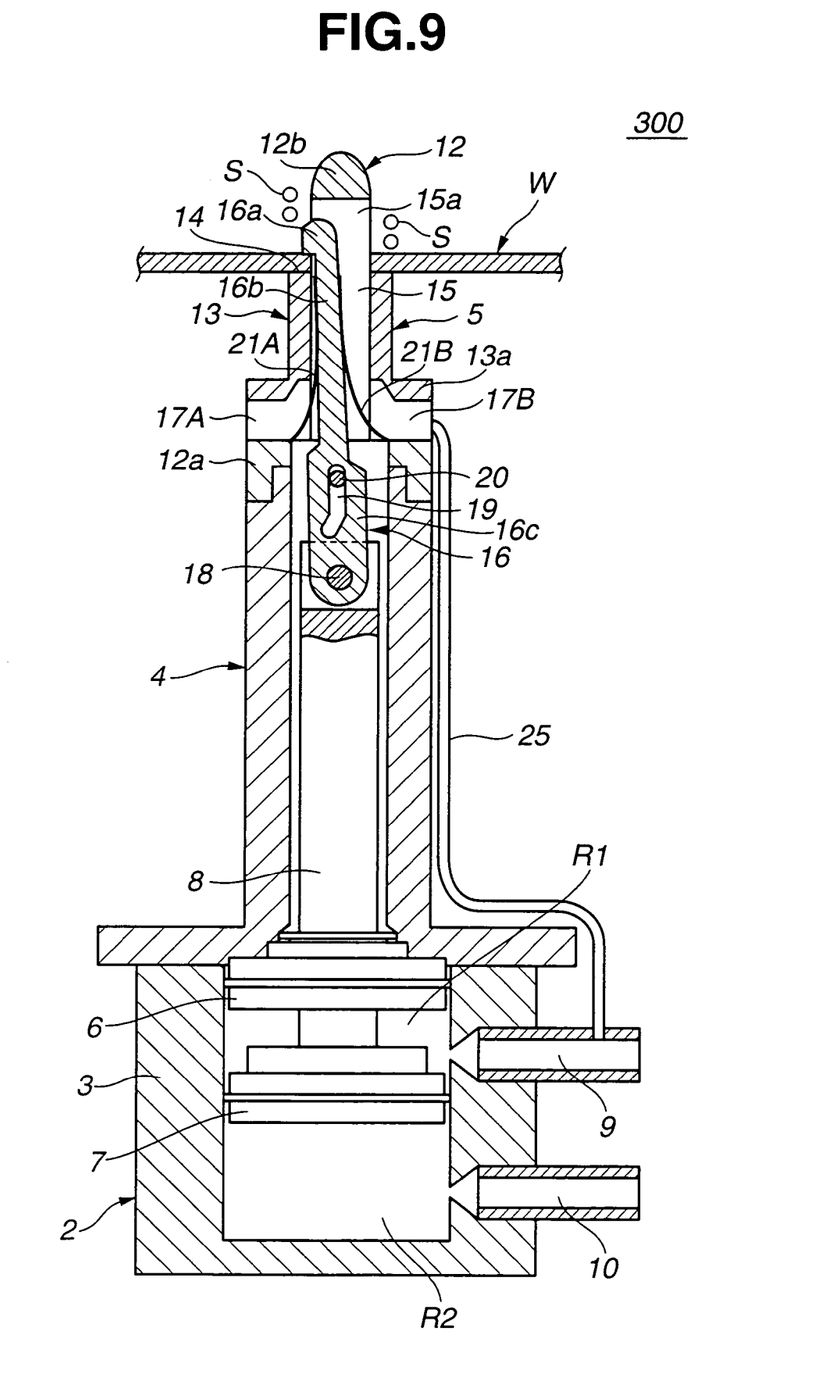
FIG. 9 is a view similar to FIG. 1, but showing a positioning and clamping device of a third embodiment of the present invention.

Referring to FIG. 9, there is shown a positioning and clamping device 300 which is a third embodiment of the present invention.

Since also the device 300 of this third embodiment is similar to the device 100 of the above-mentioned first embodiment, only parts or portions that are different from those of the first embodiment 100 will be described in detail in the following.

As shown, an air tube 25 extends from the port 9 of upper work chamber R1 of air cylinder 2 to the right-positioned escape port 17B. An air blow nozzle 26 is connected to the leading end of air tube 25 and pointed toward the base portion of right guide plate 21B.

In this third embodiment 300, part of the compressed air is kept blown into the right-positioned escape port 17B from air blow nozzle 26 as long as camp arm 16 assumes the clamp condition, that is, as long as the compressed air is kept led to the upper work chamber R1 of air cylinder 2. Accordingly, if spatters "S" of welding fly to the area of locating pin 5 and into slit 15, the compressed air blown from air blow nozzle 26 works to drive the spatters "S" back to the outside of slit 15.

Figure 10:
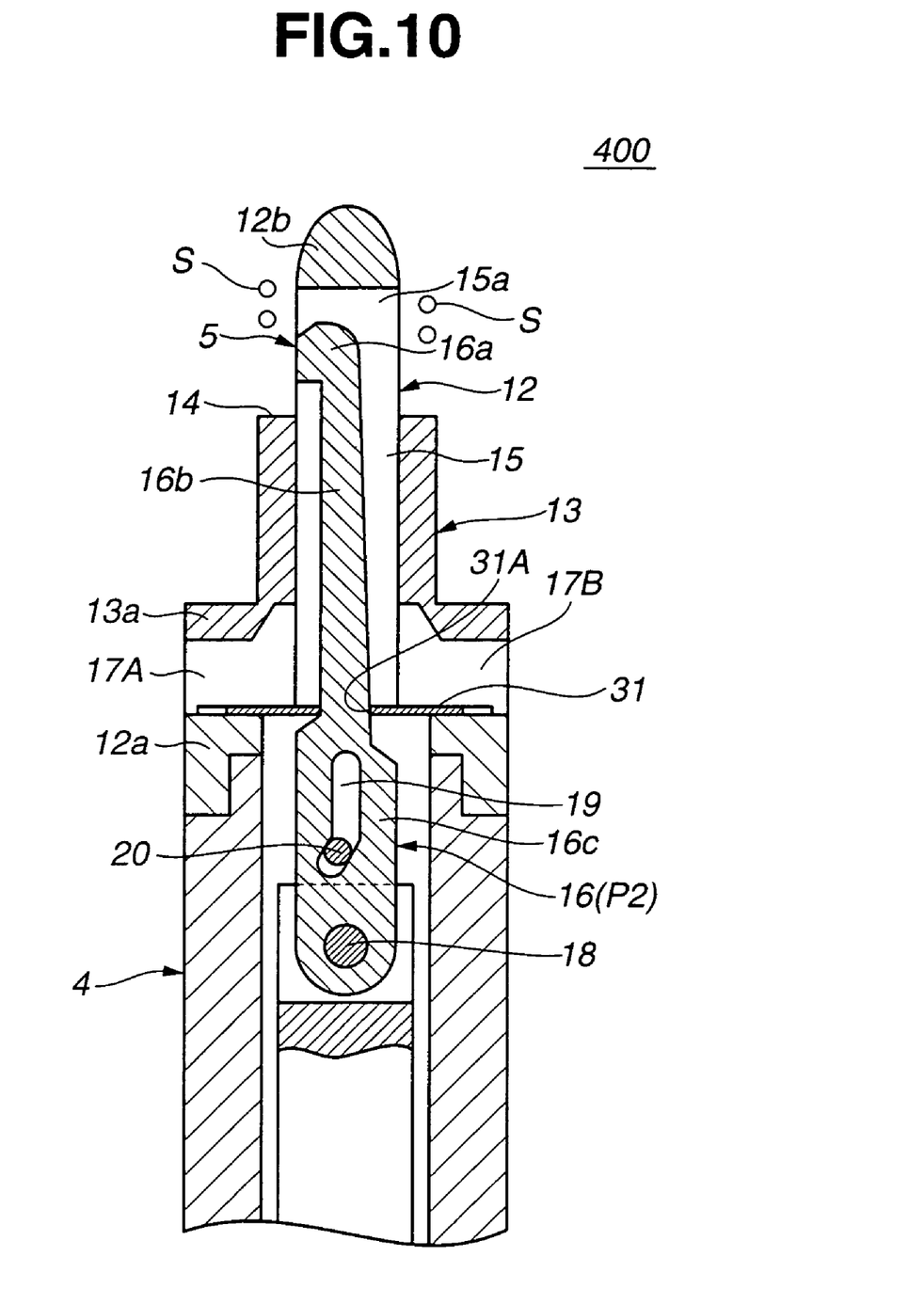
FIG. 10 is a view similar to FIG. 4, but showing a positioning and clamping device of a fourth embodiment of the present invention.
Figure 11:
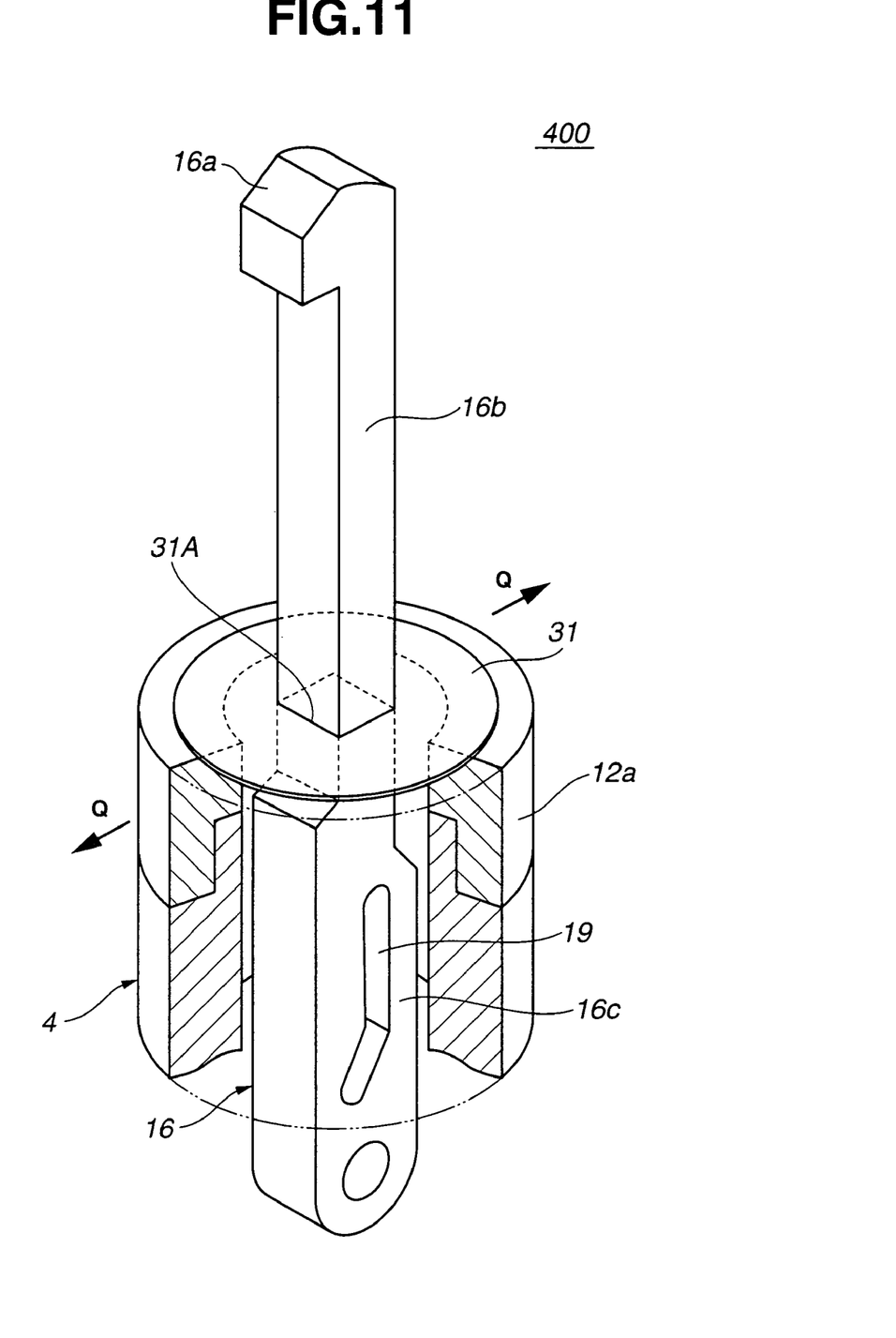
FIG. 11 is a perspective view of an essential portion of the device of FIG. 10.

Referring to FIGS. 10 and 11, there is shown a positioning and clamping device 400 which is a fourth embodiment of the present invention.

In this fourth embodiment 400, a circular plate 31 is used in place of the above-mentioned guard unit 21 and thus, the entire construction of the device 400 of this embodiment is simple as compared with the above-mentioned first, second and third embodiments 100, 200 and 300.

Figure 12:
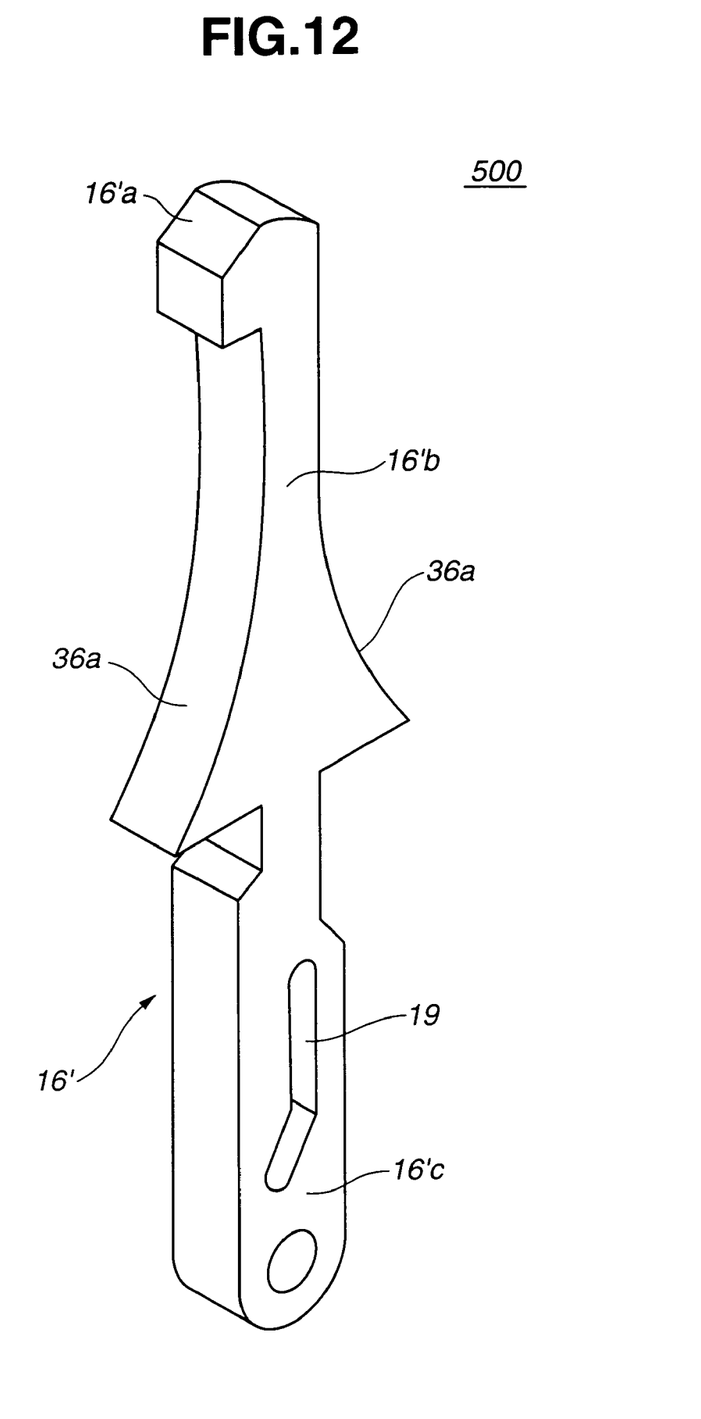
FIG. 12 is a perspective view of a clamp arm which is employed in a positioning and clamping device of a fifth embodiment of the present invention.

That is, as is seen from FIGS. 10 and 12, circular plate 31 has at a center thereof an opening 31A through which shank portion 16b of clamp arm 16 passes.

As is seen from FIG. 10, the diameter of circular plate 31 is somewhat smaller than that of the circular flange portion 12a of pin member 12. Circular plate 31 is horizontally slidably put on a flat upper surface of flange portion 12a and although not well shown in the drawings, circular plate 31 is horizontally slidably put between the flat upper surface of flange portion 12a and a flat lower surface of flange portion 13a of table member 13.

Thus, as is seen from FIG. 11, when clamp arm 16 pivots about pin 18, circular plate 31 slides on the flat upper surface of flange portion 12a in the directions of the reference "Q".

As is seen from FIG. 10, due to provision of circular plate 31, the upper portion 15a of slit 15 and the interior of post member 4 are isolated from each other. Accordingly, the spatters "S" of welding are suppressed from entering the interior of post member 4, and thus, malfunction of clamp arm 16 caused by such spatters "S" can be avoided.

Referring to FIG. 12, there is shown a clamp arm 16' that is used in a positioning and clamping device 500 of a first embodiment of the present invention.

That is, in this fifth embodiment 500, clamp arm 16' is used in place of clamp arm 16 and guard unit 21 that are used in the device 100 of the first embodiment.

As shown, the shank portion 16'b of clamp arm 16' is formed with a triangular portion with sloped opposed surfaces 36a. Of course, shank portion 16'b is so sized and constructed as not to interfere with flange portions 12a and 13a of pin member 12 and table member 13 during the movement of clamp arm 16' between the clamp position and the unclamp position.

As will be understood from the shape of clamp arm 16' with the aid of FIG. 1, in case of positioning and clamping device 500 of the fifth embodiment, the isolated connection between the interior of slit 15 and the interior of post member 4 is kept but in incompletely due to provision of the sloped opposed surfaces 36a. Thus, entering of the spatters "S" of welding into the interior of post member 4 is suppressed or at least minimized. In this embodiment 500, any means that corresponds to guard unit 21 is not used, and thus, simpler construction of the device 500 is achieved.

The entire contents of Japanese Patent Applications 2004-116337 filed Apr. 12, 2004 and 2005-76379 filed Mar. 17, 2005 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A positioning and clamping device for positioning and clamping a work panel that has a locating opening formed therethrough, comprising:
   a hollow post member;
   a locating pin mounted on the post member, the locating pin being formed with a work seating surface onto which a peripheral portion of the locating opening of the work panel is seated when the locating pin is inserted into the locating opening;
   a slit defined in the locating pin and having a first portion exposed to the outside of the locating pin and a second portion exposed to the interior of the post member;
   a clamp arm axially movably received in the slit and having a hook-shaped head portion exposed to the first portion of the slit and a base portion exposed to the interior of the post member, the clamp arm being movable between a clamp position wherein the hook-shaped head portion is positioned near the work seating surface while projecting outward from the first portion of the slit and an unclamp position wherein the hook-shaped head portion is positioned away from the work setting surface while being retracted in the first portion of the slit;
   a drive mechanism installed in the interior of the post member to axially move the clamp arm between the clamp and unclamp positions; and
   a guard structure that isolates the interior of the post member from the interior of the slit while permitting the axial movement of the clamp arm in the slit.

2. A positioning and clamping device as claimed in claim 1, in which the guard structure is constructed to slidably contact the clamp arm.

3. A position and clamping device as claimed in claim 1, in which the guard structure comprises a resilient member that is constantly, resiliently and slidably pressed against the clamp arm.

4. A position and clamping device as claimed in claim 1, in which the guard structure comprises:
   a pair of guide plates constructed of a resilient material and arranged in the slit having base portions thereof fixed to given portions of the locating pin and strip portions thereof resiliently pressed against opposed surfaces of the clamp arm.

5. A position and clamping device as claimed in claim 4, in which one of the guide plates has a spring constant that is higher than that of the other of the guide plates, and in which the guide plate having the higher spring constant is arranged to bias the clamp arm in a direction from the clamp position to the unclamp position.

6. A positioning and clamping device as claimed in claim 5, further comprising:
   a cam slot formed in the base portion of the clamp arm; and a guide pin fixed in the interior of the post member and passing through the cam slot, whereby when the clamp arm is axially moved by the drive mechanism, the cam slot is guided by the guide pin thereby to induce a swing movement of the clamp arm.

7. A position and clamping device as claimed in claim 4, further comprising a guiding structure through which the axial movement of the clamp arm is guided by the strip portions of the guide plates.

8. A positioning and clamping device as claimed in claim 7, in which the guiding structure comprises:

ridges respectively formed on opposed surfaces of a shank portion of the clamp arm; and guide grooves provided by the strip portions of the guide plates and slidably engaged with the ridges of the clamp arm.

9. A positioning and clamping device as claimed in claim 7, in which the guiding structure comprises:

grooves respectively formed on opposed surfaces of a shank portion of the clamp arm; and guide pawls provided by the strip portions of the guide plates and slidably engaged with the grooves of the clamp arm.

10. A positioning and clamping device as claimed in claim 1, in which the locating pin is formed with diametrically aligned escape ports that are merged with the second portion of the slit.

11. A positioning and clamping device as claimed in claim 10, further comprising an air blow nozzle that is arranged to blow a compressed air into one of the escape ports at least when the clamp arm assumes the clamp position.

12. A positioning and clamping device as claimed in claim 11, in which the air blow nozzle is connected to a compressed air source through an air tube, and in which the compressed air source is connected to the drive mechanism to actuate the same.

13. A position and clamping device as claimed in claim 12, in which the drive mechanism comprises:

a cylinder;

a piston slidably received in the cylinder to divide an interior of the cylinder into a first work chamber and a second work chamber;

a piston rod having one end connected to the piston and the other end pivotally connected the base portion of clamp arm;

a first port exposed to the first work chamber to feed the same with the compressed air; and a second port exposed to the second work chamber to feed the same with the compressed air, wherein the air tube extends between the air blow nozzle and the first port.

14. A positioning and clamping device as claimed in claim 1, in which the guard structure comprises:

a guide plate constructed of a resilient material and arranged in the slit having a base portion thereof fixed to a given portion of the locating pin and a strip portion thereof resiliently pressed against a surface of the clamp arm thereby to bias the clamp arm in a direction from the unclamp position to the clamp position.

15. A position and clamping device as claimed in claim 1, in which the guard structure comprises a circular plate that has an opening through which a shank portion of the clamp arm passes, and in which the circular plate is laterally slidably received in a slit defined in the locating pin, so that when the clamp arm is moved between the clamp position and the unclamp position.

16. A position and clamping device as claimed in claim 1, in which the guard structure comprises a triangular portion provided by a shank portion of the clamp arm, the triangular portion including sloped opposed surfaces.

17. A positioning and clamping device for positioning and clamping a work panel that has a locating opening formed therethrough, comprising:

a hollow post member;

a locating pin mounted on the post member, the locating pin being formed with a work seating surface onto which a peripheral portion of the locating opening of the work panel is seated when the locating pin is inserted into the locating opening;

a slit defined in the locating pin and having a first portion exposed to the outside of the locating pin and a second portion exposed to the interior of the post member;

a clamp arm axially movably received in the slit and having a hook-shaped head portion exposed to the first portion of the slit and a base portion exposed to the interior of the post member, the clamp arm being movable between a clamp position wherein the hook-shaped head portion is positioned near the work seating surface while projecting outward from the first portion of the slit and an unclamp position wherein the hook-shaped head portion is positioned away from the work setting surface while being retracted in the first portion of the slit;

a drive mechanism installed in the interior of the post member to axially move the clamp arm between the clamp and unclamp positions by a power of compressed air; and a pair of guide pates that isolate the interior of the post member from the interior of the slit while permitting the axial movement of clamp arm in the slit, the guide plates being constructed of a resilient material and have base portions thereof fixed to given portions of the locating pin and strip portions thereof resiliently pressed against opposed surfaces of the clamp arm.

18. A positioning and clamping device as claimed in claim 17, further comprising:

diametrically aligned escape ports formed in the locating pin and merged with the second portion of the slit;

an air blow nozzle arranged to blow a compressed air into one of the escape ports at least when the clamp arm assumes the clamp position; and an air tube that extends from a source of the compressed air to the air blow nozzle.

19. A positioning and clamping device for positioning and clamping a work panel that has a locating opening formed therethrough, comprising:

a hollow post member;

a locating pin mounted on the post member, the locating pin being formed with a work seating surface onto which a peripheral portion of the locating opening of the work panel is seated when the locating pin is inserted into the locating opening;

a slit defined in the locating pin and having a first portion exposed to the outside of the locating pin and a second portion exposed to the interior of the post member;

a clamp arm axially movably received in the slit and having a hook-shaped head portion exposed to the first portion of the slit and a base portion exposed to the interior of the post member, the clamp arm being movable between a clamp position wherein the hook-shaped head portion is positioned near the work seating surface while projecting outward from the first portion of the slit and an unclamp position wherein the hook-shaped head portion is positioned away from the work setting surface while being retracted in the first portion of the slit;

a drive mechanism installed in the interior of the post member to axially move the clamp arm between the clamp and unclamp positions by a power of compressed air; and a guide plate constructed of a resilient material and arranged in the slit having a base portion thereof fixed to a given portion of the locating pin and a strip portion thereof resiliently pressed against a surface of the clamp arm thereby to bias the clamp arm in a direction from the unclamp position to the clamp position.

* * * * *